Dec. 7, 1954

J. BOURSEAU ET AL 2,696,531

CROSS TALK MEASURING APPARATUS

Filed June 7, 1952

INVENTORS
JEAN BOURSEAU &
GEORGES COMTE
BY:

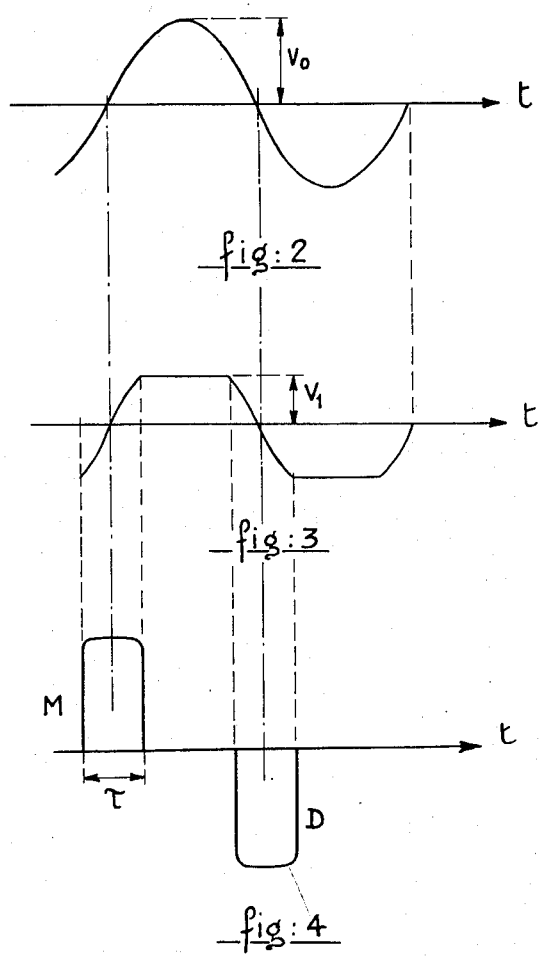
fig: 2
fig: 3
fig: 4
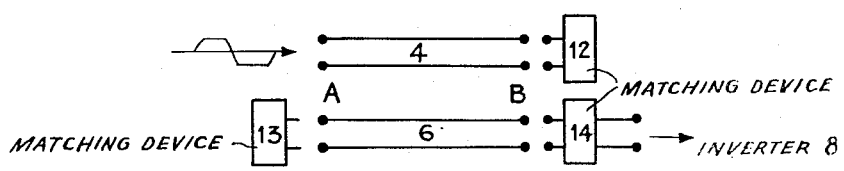
fig: 5

Dec. 7, 1954   J. BOURSEAU ET AL   2,696,531
CROSS TALK MEASURING APPARATUS
Filed June 7, 1952                                                   3 Sheets-Sheet 3
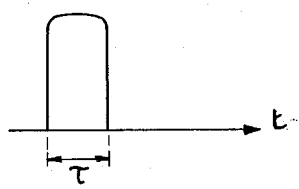
fig: 6
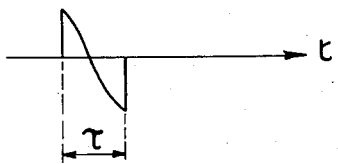
fig: 7
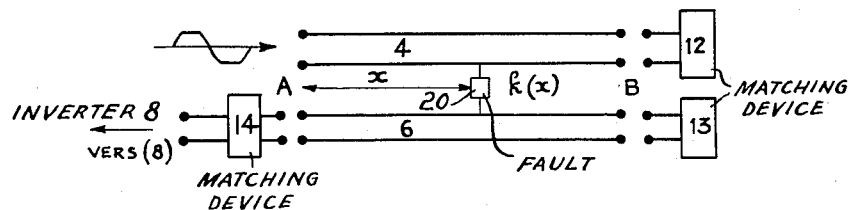
fig: 8
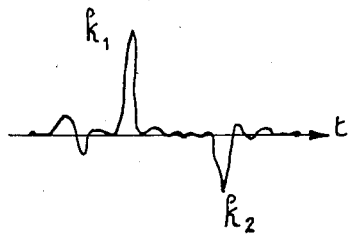
fig: 9
INVENTORS:
JEAN BOURSEAU
GEORGES COMTE
BY:

2,696,531

CROSS TALK MEASURING APPARATUS

Jean Bourseau and Georges Comte, Lyon, France, assignors to Compagnie Generale d'Electricite, Paris, France, a corporation of France Application June 7, 1952, Serial No. 292,316

Claims priority, application France July 20, 1951

10 Claims. (Cl. 179—175.3)

It is well known that in order to measure the cross-talk produced by the mutual action between two circuits, for example, two sections of cable, a voltage which is variable as a function of time may be applied to the input of one of the circuits, and the voltage which appears cross a pair of terminals of the other circuit measured. If it is the far-end cross-talk which is to be ascertained, the voltage is measured at the remote end of the second circuit. If on the other hand, the near-end cross-talk is to be ascertained, the voltage at the end of the second circuit close to the input end of the first circuit is measured.

If cross-talk is due to direct interaction between the two circuits, the voltage which appears across the terminals of the second circuit is equal to the first derivative of the interference voltage applied to the first circuit multiplied by a co-efficient which depends on the capacitive and inductive coupling between the two circuits. If, on the other hand, the cross-talk is due to coupling between the two circuits by means of a third circuit, the cross-talk voltage is equal to the second derivative of the interference voltage multiplied by a co-efficient dependent on the coupling between each of the two circuits and the third circuit.

The measurement of the far-end cross-talk makes it possible to know the total value and also the nature of the cross-talk between the two circuits.

In effect, the currents are propagated in the same manner in the two circuits, whatever the number and position of the faults between these circuits. Thus only a single function is obtained derived from the interference voltage $V_0$ $(t)$.

On the other hand, the measurement of near-end cross-talk makes it possible to locate each of the faults between the two circuits; in fact, each fault gives rise to a voltage which is operated on by a phase shift in proportion to the path of the current from the input of the interfering circuit to the input of the disturbed circuit, that is to say, to double the distance between said fault and the input of the two circuits.

The object of the present invention is to provide an apparatus enabling these two kinds of cross-talk to be measured. This apparatus employs an interference voltage $V_0$ $(t)$ chosen in such a way, that after derivation, it gives impulses permitting easy location of the faults of cross-talk, and moreover, makes it possible to measure the cross-talk as a function of the frequency, over a very wide frequency range.

This apparatus comprises a cathode oscillograph having a horizontal saw-tooth sweep voltage which is synchronized by a sinusoidal voltage $V_0$ sin $\omega t$, and vertical deflection plates which can be connected either to the input end of the interfering circuit, by means of a calibrated adjustable attenuator, or to either end of the disturbed circuit. The interfering circuit is fed by a generator which includes a source supplying a sinusoidal voltage $V_0$ sin $\omega t$, and a limiter which limits the amplitude of each alternation to a value $V_1=kV_0$, $k$ being a constant having a value of less than unity. This voltage produces in the disturbed circuit a succession of impulses of substantially rectangular shape, each having a duration $\tau$ where sin $\omega\tau=k$.

A rectifying device, of the known type, only allows the images of the impulses which are all of the same direction to remain on the screen.

The novel features which are considered as characteristic of the invention are set forth in particular in the appended claims. The invention itself both as to its construction and method of operation, together with additional objects and advantages thereof, will be best understood from the following description of specific embodiments when read in connection with the accompanying drawing, in which:

Fig. 2 is a diagram of the voltage output of generator 1;

Fig. 3 is a diagram of the voltage output of limiter 2;

Fig. 4 is a diagram of the impulses which appear across the terminals of transmission line 6 corresponding to the input voltage illustrated in Fig. 3;

Fig. 5 is a block diagram of a circuit in accordance with the invention for the measurement of remote-end cross-talk;

Fig. 6 is a diagram of the waveform observed on the screen of the cathode ray oscilloscope when there is direct cross-talk between two circuits;

Fig. 7 is a diagram of the waveform observed on the screen of the cathode ray oscilloscope in the case of indirect cross-talk via a tertiary circuit;

Fig. 8 is a block diagram of a circuit in accordance with the invention for detecting near-end cross-talk; and Fig. 9 is a diagram of the waveform on the screen of the cathode ray oscilloscope with the circuit arranged as shown in Fig. 8 when two faults are present.

In the figures like reference numerals designate like circuit components.

Figure 1:
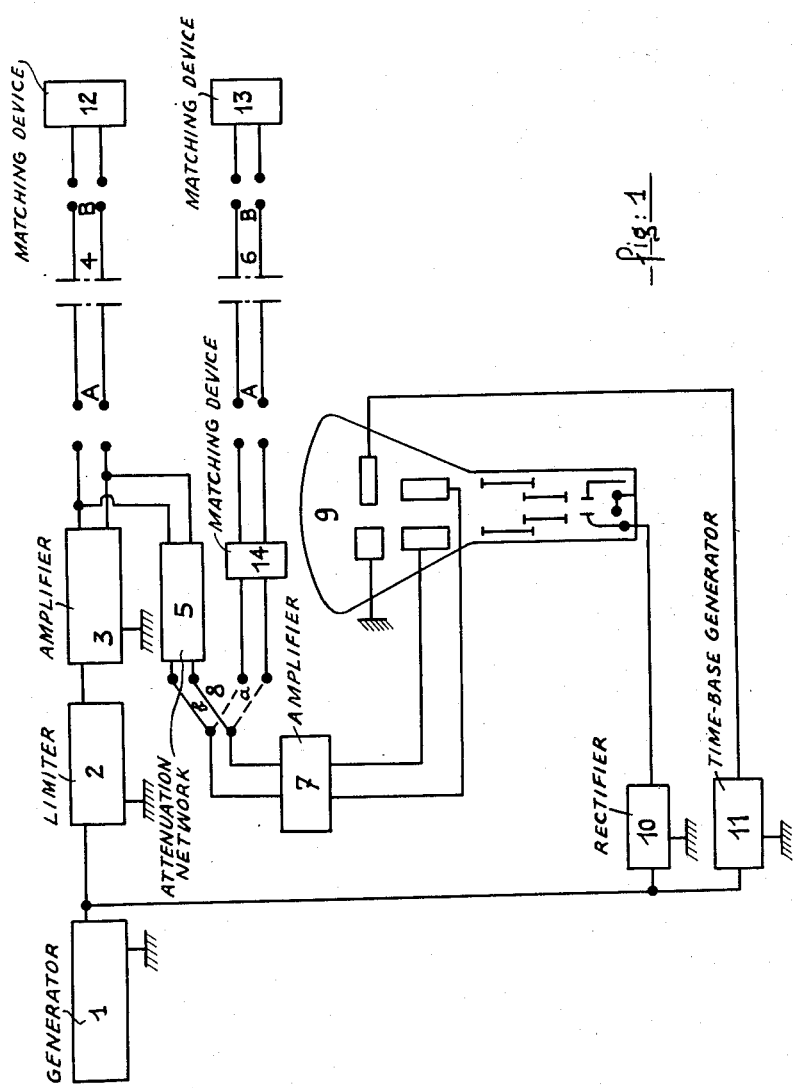
Fig. 1 is a block diagram of an apparatus in accordance with the invention.

Referring now to the drawing and more particularly to Fig. 1, there is shown sinusoidal wave generator 1 which is adjustable in frequency and which supplies a voltage $V_0$ sin $\omega t$, limiter 2 which limits the output voltage of generator 1 to a peak voltage $V_1=kV_0$, amplifier 3 and transmission line 4. The transmission line has a near (input) end A and a remote-end B. Connected across the remote-end B is a matching device 12 which terminates transmission line 4 in its characteristic impedance. Input-end A of transmission line 4 is connected to attenuation network 5 which provides an adjustable amount of attenuation to a signal applied thereto. Attenuation network 5 may be conneced by means of converter (switch) 8 when the latter is in position $b$, as shown, to amplifier 7 which in turn is connected to the vertical deflecting plates of cathode ray oscilloscope 9.

Transmission line 6 (the disturbed circuit) is terminated at its remote-end B in its characteristic impedance by matching device 13 and is also terminated at its near-end A in its characteristic impedance by matching device 14. This line may be connected through converter 8 to the input of amplifier 7 when the converter is in position $a$, as indicated by the dashed lines.

Time-base generator 11 which is synchronized by a portion of the output of sinusoidal generator 1 is connected to the horizontal deflection plates of the cathode ray oscilloscope 9. Rectifier 10 is in circuit between sinusoidal generator 1 and the Wehnelt cylinder of the cathode ray tube and is adjusted so as to eliminate the negative-going portions of the sinusoidal wave output of generator 1.

Waveforms at various points in the circuit of Fig. 1 are illustrated in Figs. 2, 3 and 4. Fig. 2 illustrates the sinusoidal output of generator 1 which has an amplitude $V_0$. The output of generator 1 is limited by limiter 2 and a resultant wave is obtained having an amplitude $V_1$ and which is substantially square in nature as illustrated in Fig. 3. The voltage pulses which appear at the terminals of transimnssion line 6 are illustrated in Fig. 4.

In order to measure the far-end cross-talk (Fig. 5) the remote end B of the disturbed circuit 6 is connected to matching device 14; then the inverter 8 is placed in position $a$ and the image of the impulses induced in the circuit 6 is observed on the screen. This inverter is then placed in position $b$, then the attenuator network 5 is adjusted until an impulse is observed on the screen having the same peak voltage as in the previous case; the value of the attenuation read on the calibrated network is the attenuation of the transitory far-end cross-talk between the circuits 4 and 6.

In order to measure near-end cross-talk (Fig. 8) on the other hand, the input A of the disturbed circuit 6 is connected to matching device 14. If then a fault 20 situated at the distance $x$ from the end A of the two circuits causes at this place such a coupling between said circuits that the ratio of the voltage which appears on the input of 6 to the voltage supplied on the input of 4 is equal to $k$, a voltage peak will be observed on the screen of the cathode tube the amplitude of which is in proportion to $k$, and of which the abscissa in relation to the origin of the curve is proportionate to the distance $x$. The curve obtained on the screen therefore represents the function $k(x)$. Fig. 9 shows an example of a curve of this kind, causing the appearance of two voltage peaks $k_1$ and $k_2$ corresponding to two faults which are thus localised.

What is claimed is:

1. Apparatus for measuring cross-talk between a first and a second transmission line, each of said lines having an input and an output end comprising, in combination, a sinusoidal electric current generator with adjustable frequency and having output terminals; a voltage limiter having input and output terminals, said input terminals being connected to said output terminals of said sinusoidal electric current generator for transforming the sinusoidal electrical current variations into substantially rectangular electric current variations; a first amplifier having input terminals connected to the output terminals of said voltage limiter and output terminals adapted to be connected to the input end of the first transmission line; a matching device adapted to be electrically connected to the output end of said first transmission line; an adjustable calibrated attenuator circuit having input terminals thereof electrically connected to the output terminals of said first amplifier; a second matching device adapted to be interchangeably connected to either one of the ends of said second transmission line; a third matching device adapted to be connected to the end of said second transmission line to which said second matching device is not connected; a second amplifier having input and output terminals; an inverter electrically connected to said input terminals of said second amplifier, said inverter being adapted to be selectively connected to the output terminals of said adjustable calibrated attenuator circuit and the input end of said second transmission line; and a cathode ray tube having horizontal and vertical deflection plates, said horizontal plates being adapted to be connected to a saw tooth voltage for sweeping an electron beam in said cathode ray tube in a horizontal direction, said vertical plates being electrically connected to said output terminals of said second amplifier for sweeping said electron beam in said cathode ray tube in a vertical direction.

2. Apparatus for measuring cross-talk between a first and a second transmission line, each of said lines having an input and an output end comprising, in combination, a sinusoidal electric current generator with adjustable frequency and having output terminals; a voltage limiter having input and output terminals, said input terminals being connected to said output terminals of said sinusoidal electric current generator for transforming the sinusoidal electrical current variations into substantially rectangular electric current variations; a first amplifier having input terminals connected to the output terminals of said voltage limiter and output terminals adapted to be connected to the input end of the first transmission line; a matching device adapted to be electrically connected to the output end of said first transmission line; an adjustable calibrated attenuator circuit having input terminals thereof electrically connected to the output terminals of said first amplifier; a second matching device adapted to be interchangeably connected to either one of the ends of said second transmission line; a third matching device adapted to be connected to the end of said second transmission line to which said second matching device is not connected; a second amplifier having input and output terminals; an inverter electrically connected to said input terminals of said second amplifier, said inverter being adapted to be selectively connected to the output terminals of said adjustable calibrated attenuator circuit and the input end of said second transmission line; and means electrically connected to said output terminals of said second amplifier for indicating the magnitude of the output voltage of said second amplifier.

3. Apparatus for measuring cross-talk between a first and a second transmission line, each of said lines having an input and an output end, comprising, in combination, a rectangular electric current pulse generator with adjustable frequency and having output terminals adapted to be connected to the input end of the first transmission line; a matching device adapted to be electrically connected to the output end of said first transmission line; an adjustable calibrated attenuator circuit having input terminals thereof electrically conneced to the output terminals of said rectangular electric current pulse generator; a second matching device adapted to be interchangeably connected to either one of the ends of said second transmission line; a third matching device adapted to be connected to the end of said second transmission device to which said second matching device is not connected; an electric current indicator; and an inverter electrically connected to said electric current indicator, said indicator being adapted to be selectively connected by means of said inverter to the output terminals of said adjustable calibrated attenuator circuit and to the input end of said second transmission line.

4. Apparatus for measuring cross-talk between a first and a second transmission line, each of said lines having an input and an output end, comprising, in combination, a rectangular electric current pulse generator with adjustable frequency and having output terminals adapted to be connected to the input end of the first transmission line; a matching device adapted to be electrically connected to the output end of said first transmission line; an adjustable calibrated attenuator circuit having input terminals thereof elecrically conneced to the output terminals of said rectangular electric current pulse generator; a second matching device adapted to be interchangeably connected to either one of the ends of said second transmission line; a third matching device adapted to be connected to the end of said second transmission device to which said second matching device is not connected; an electric current indicator; and a switch having stationary and movable contacts, said movable contacts being electrically connected to said electric current indicator, the output terminals of said adjustable calibrated attenuator circuit and the input end of said second transmission line being connected to said stationary contacts of said switch, whereby said indicator may be selectively connected by means of said switch to the output terminals of said adjustable calibrated attenuator circuit or to the input end of said second transmission line.

5. Apparatus for measuring cross-talk between a first and a second transmission line, each of said lines having an input and an output end, comprising, in combination, a rectangular eiectric current pulse generator with adjustable frequency and having output terminals adapted to be connected to the input end of the first transmission line; a matching device adapted to be electrically connected to the output end of said first transmission line; an adjustable calibrated attenuator circuit having input terminals thereof electrically connected to the output terminals of said rectangular electric current pulse generator; a second matching device adapted to be interchangeably connected to either one of the ends of said second transmission line; a third matching device adapted to be connected to the end of said second transmission device to which said second matching device is not connected; an electric current indicator; and means electrically connected to said electric current indicator for selectively connecting said electric current indicator to the output terminals of said adjustable calibrated attenuator circuit or to the input end of said second transmission line.

6. Apparatus for measuring cross-talk between a first and a second transmission line, each of said lines having an input and an output end comprising, in combination, a sinusoidal electric current generator with adjustable frequency and having output terminals; a voltage limiter having input and output terminals, said input terminals being connetced to said output terminals of said sinusoidal electric current generator for transforming the sinusoidal electric current variations into substantially rectangular electric current variations; a first amplifier having input terminals connected to the output terminals of said voltage limiter and output terminals adapted to be connected to the input end of the first transmission line; a matchıng device adapted to be electrically connected to the output end of said first transmission line; an adjustable calibrated attenuator circuit having input terminals thereof electrically connected to the output terminals of said first amplifier; a second matching device adapted to be interchangeably connected to either one of the ends of said second transmission line; a third matching device adapted to be connected to the end of said second transmission line to which said second matching device is not connected; a second amplifier having input and output terminals; an inverter electrically connected to said input terminals of said second amplifier, said inverter being adapted to be selectively connected to the output terminals of said adjustable calibrated attenuator circuit and the input end of said second transmission line; a voltage rectifier connected at its input terminals to the output of said sinusoidal electric current generator; a saw tooth voltage generator likewise connected at its input terminals to the output of said sinusoidal electric current generator; and a cathode ray tube having a cathode, and horizontal and vertical deflection plates, said cathode being electrically connected to the output of said voltage rectifier, one half of the same part of the alternating cycle of the output of said sinusoidal electric current genertaor being short-circuited to ground, said horizontal plates being connected to the output of said saw tooth generator, said vertical plates being electrically connected to said output terminals of said second amplifier.

7. Apparatus for measuring cross-talk between a first and a second transmission line, each of said lines having an input and an output end comprising, in combination, a sinusoidal electric current generator with adjustable frequency and having output terminals; a voltage limiter having input and output terminals, said input terminals being connected to said output terminals of said sinusoidal electric current generator for transforming the sinusoidal electrical current variations into substantially rectangular electric current variations; a first amplifier having input terminals connected to the output terminals of said voltage limiter and output terminals adapted to be connected to the input end of the first transmission line; a matching device adapted to be electrically connected to the output end of said first transmission line; an adjustable calibrated attenuator circuit having input terminals thereof electrically connected to the ouput terminals of said first amplifier; a second matching device adapted to be interchangeably connected to either one of the ends of said second transmission line; a third matching device adapted to be connected to the end of said second transmission line to which said second matching device is not connected; a second amplifier having input and output terimnals; an inverter electrically connected to said input terminals of said second amplifier, said inverter being adapted to be selectively connected to the output terminals of said adjustable calibrated attenuator circuit and the input end of said second transmission line; a voltage rectifier connected at its input terminals to the output of said sinusoidal electric current generator; a saw tooth voltage generator likewise connected at its input terminals to the output of said sinusoidal electric current generator; and a cathode ray tube having a cathode, and horizontal and vertical deflection plates, said cathode being electrically connected to the output of said voltage rectifier, the negative one half of the alternating cycle of the output of said sinusoidal electric current generator being short-circuited to ground, said horizontal plates being connected to the output of said saw tooth generator, said vertical plates being electrically connected to said output terminals of said second amplifier.

8. Apparatus for measuring cross-talk between a first and a second transmission line, each of said lines having an input and an output end, comprising, in combination, a rectangular electric current pulse generator with adjustable frequency and having output terminals adapted to be connected to the input end of the first transmission line; a matching device adapted to be electrically connected to the output end of said first transmission line; an adjustable calibrated attenuator circuit having input terminals thereof electrically connected to the output terminals of said rectangular electric current pulse generator; a second matching device adapted to be interchangeably connected to either one of the ends of said second transmission line; a third matching device adapted to be connected to the end of said second transmission device to which said second matching device is not connected; an amplifier having input and output terminals; an inverter electrically connected to said input terminals of said amplifier, said inverter being adapted to be electrically connected to the output terminals of said adjustable calibrated attenuator circuit and the input end of said second transmission line; an electric current indicator; and an inverter electrically connected to said electric current indicator, said indicator being adapted to be selectively connected by means of said inverter to the output terminals of said adjustable calibrated attenuator circuit and to the input end of said second transmission line.

9. Apparatus for measuring cross-talk between a first and a second transmission line, each of said lines having an input and an output end, comprising, in combination, a rectangular electric current pulse generator with adjustable frequency and having output terminals adapted to be connected to the input end of the first transmission line; a matching device adapted to be electrically connected to the ouput end of said first transmission line; an adjustable calibrated attenuator circuit having input terminals thereof electrically connected to the output terminals of said rectangular electric current pulse generator; a second matching device adapted to be interchangeably connected to either one of the ends of said second transmission line; a third matching device adapted to be connected to the end of said second transmission device to which said second matching device is not connected; an amplifier having input and output terminals; an inverter electrically connected to said input terminals of said amplifier, said inverter being adapted to be electrically connected to the output terminals of said adjustable calibrated attenuator circuit and the input end of said second transmission line; an electric current indicator; and means electrically connected to said output terminals of said amplifier for indicating the magnitude of the output voltage of said amplifier.

10. Apparatus for measuring cross-talk between a first and a second transmission line, each of said lines having an input and an output end, comprising, in combination, a rectangular electric current pulse generator with adjustable frequency and having output terminals adapted to be connected to the input end of the first transmission line; a matching device adapted to be electrically connected to the output end of said first transmission line; an adjustable calibrated attenuator circuit having input terminals thereof electrically connected to the output terminals of said rectangular electric current pulse generator; a second matching device adapted to be interchangeably connected to either one of the ends of said second transmission line; a third matching device adapted to be connected to the end of said second transmission device to which said second matching device is not connected; an amplifier having input and output terminals; an electric current indicator electrically connected to said output terminals of said amplifier; and means electrically connected to said input terminals of said amplifier for selectively connecting said amplifier to the output terminals of said adjustable calibrated attenuator circuit or to the input end of said second transmission line.

References Cited in the file of this patent

UNITED STATES PATENTS

| Number | Name | Date |
|---|---|---|
| 2,492,400 | Robertson | Dec. 27, 1949 |